United States Patent
Kim et al.

(10) Patent No.: US 10,544,247 B2
(45) Date of Patent: Jan. 28, 2020

(54) SUPPORTED HYBRID METALLOCENE CATALYST, AND METHOD FOR PREPARING POLYOLEFIN USING THE SAME

(71) Applicant: LG Chem, Ltd., Seoul (KR)

(72) Inventors: Sun Mi Kim, Daejeon (KR); Yi Young Choi, Daejeon (KR); Ki Soo Lee, Daejeon (KR); Bog Ki Hong, Daejeon (KR); Sung Min Lee, Daejeon (KR); Soon Ho Sun, Daejeon (KR); Jin Young Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/773,748

(22) PCT Filed: Nov. 3, 2017

(86) PCT No.: PCT/KR2017/012420
§ 371 (c)(1),
(2) Date: May 4, 2018

(87) PCT Pub. No.: WO2018/117403
PCT Pub. Date: Jun. 28, 2018

(65) Prior Publication Data
US 2019/0062474 A1    Feb. 28, 2019

(30) Foreign Application Priority Data

Dec. 19, 2016 (KR) .......... 10-2016-0173802
Nov. 2, 2017 (KR) .......... 10-2017-0145519

(51) Int. Cl.
*C08F 4/6592* (2006.01)
*C08F 4/653* (2006.01)
*C08F 210/16* (2006.01)
*C08F 4/659* (2006.01)

(52) U.S. Cl.
CPC ........ *C08F 210/16* (2013.01); *C08F 4/65904* (2013.01); *C08F 4/65927* (2013.01); *C08F 4/65925* (2013.01)

(58) Field of Classification Search
CPC .............. C08F 4/65904; C08F 4/65925; C08F 4/65927; C08F 210/16
See application file for complete search history.

(56) References Cited

U.S. PATENT DOCUMENTS

| | | |
|---|---|---|
| 5,032,562 A | 7/1991 | Lo et al. |
| 5,525,678 A | 6/1996 | Mink et al. |
| 5,914,289 A | 6/1999 | Razavi |
| 7,655,740 B2 | 2/2010 | Nagy et al. |
| 7,781,549 B2 | 8/2010 | Nagy et al. |
| 9,975,969 B2 * | 5/2018 | Cho ................ C08F 10/02 |
| 2016/0237187 A1 | 8/2016 | Hong et al. |
| 2016/0297843 A1 | 10/2016 | Lee et al. |
| 2017/0029538 A1 * | 2/2017 | Song ................ C08F 4/64 |
| 2017/0107307 A1 | 4/2017 | Park et al. |
| 2017/0233511 A1 | 8/2017 | Sun et al. |
| 2017/0283522 A1 | 10/2017 | Lee et al. |

FOREIGN PATENT DOCUMENTS

| | | |
|---|---|---|
| KR | 20040076965 A | 9/2004 |
| KR | 20150045369 A | 4/2015 |
| KR | 20150057964 A | 5/2015 |
| KR | 20150058020 A | 5/2015 |
| KR | 20150058054 A | 5/2015 |
| KR | 20150139462 A | 12/2015 |
| KR | 20160019875 A | 2/2016 |
| KR | 20160072826 A | 6/2016 |
| KR | 101644113 B1 | 7/2016 |
| KR | 20160123123 A | 10/2016 |
| KR | 20170004895 A | 1/2017 |
| WO | 04/076502 A1 | 9/2004 |
| WO | 2016122018 A1 | 8/2016 |

OTHER PUBLICATIONS

International Search Report for Application No. PCT/KR2017/012420 dated Feb. 9, 2018.

* cited by examiner

*Primary Examiner* — Caixia Lu
(74) *Attorney, Agent, or Firm* — Lerner, David, Littenberg, Krumholz & Mentlik, LLP

(57) ABSTRACT

The present disclosure relates to a supported hybrid metallocene catalyst and a method for preparing a polyolefin using the same. When the supported hybrid metallocene catalyst according to the present disclosure is used, a polyolefin with a multimodal molecular weight distribution and excellent environmental stress crack resistance can be prepared.

11 Claims, No Drawings

SUPPORTED HYBRID METALLOCENE CATALYST, AND METHOD FOR PREPARING POLYOLEFIN USING THE SAME

CROSS-REFERENCE TO RELATED APPLICATIONS

The present application is a national phase entry under 35 U.S.C. § 371 of International Application No. PCT/KR2017/012420 filed Nov. 3, 2017, which claims priority from Korean Patent Application No. 10-2016-0173802 filed Dec. 19, 2016 and Korean Patent Application No. 10-2017-0145519 filed Nov. 2, 2017, all of which are incorporated herein by reference.

FIELD OF THE INVENTION

The present disclosure relates to a supported hybrid metallocene catalyst and a method for preparing a polyolefin using the same.

BACKGROUND OF ART

Olefin polymerization catalyst systems may be divided into Ziegler-Natta and metallocene catalysts, and these highly active catalyst systems have been developed in accordance with their characteristics. Ziegler-Natta catalysts have been widely applied to commercial processes since they were developed in the 1950s. However, since a Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, metallocene catalysts include a main catalyst having a transition metal compound as a main component and an organometallic compound cocatalyst having aluminum as a main component. Such catalysts are single-site catalysts which are homogeneous complex catalysts, and offer a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,032,562 discloses a method for preparing a polymerization catalyst by supporting two different transition metal catalysts on one support. This catalyst is prepared by supporting a titanium (Ti)-based Ziegler-Natta catalyst which produces a high molecular weight polymer and a zirconium (Zr)-based metallocene catalyst which produces a low molecular weight polymer on one support, and results in a bimodal molecular weight distribution. This catalyst is disadvantageous in that the supporting procedure is complicated and morphology of polymers is poor due to a cocatalyst.

U.S. Pat. No. 5,525,678 discloses a method for using a catalyst system for olefin polymerization, in which a metallocene compound and a non-metallocene compound are simultaneously supported on a support to realize simultaneous polymerization of a high molecular weight polymer and a low molecular weight polymer. However, there are disadvantages that the metallocene compound and the non-metallocene compound must be separately supported and the support must be pretreated with various compounds for supporting.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Korean Patent Application No. 2003-12308 discloses a method for controlling molecular weight distributions of polymers, in which the polymerization is performed while changing a combination of catalysts in a reactor by supporting a dinuclear metallocene catalyst and a mononuclear metallocene catalyst on a support together with an activating agent. However, this method has limitations in simultaneously realizing the characteristics of respective catalysts. In addition, there is a disadvantage that the metallocene catalysts are departed from a supported component of the resulting catalyst to cause fouling in the reactor.

Therefore, to solve the above drawbacks, there is an ongoing demand for a method for preparing polyolefins with desired physical properties by easily preparing a supported metallocene catalyst having excellent activity.

Among above attempts, however, very few catalysts have been practically applied in commercial factories, and thus preparation of catalysts showing more improved polymerization performance is still required.

DETAILED DESCRIPTION OF THE INVENTION

Technical Problem

The present disclosure is to provide a supported hybrid metallocene catalyst capable of producing a polyolefin having excellent processability and exhibiting a multimodal molecular weight distribution.

Technical Solution

The present disclosure provides a supported hybrid metallocene catalyst, including: a first metallocene compound represented by the following Chemical Formula 1; a second metallocene compound which is represented by the following Chemical Formula 2 and one of $C_1$ and $C_2$ of Chemical Formula 2 is represented by the following Chemical Formula 3a; a third metallocene compound which is represented by the following Chemical Formula 2 and one of $C_1$ and $C_2$ of Chemical Formula 2 is represented by the following Chemical Formula 3b; a cocatalyst; and a support.

In addition, the present disclosure provides a method for preparing a polyolefin, including the step of polymerizing olefinic monomers in the presence of the supported hybrid metallocene catalyst.

Hereinafter, the supported hybrid metallocene catalyst, and the method for preparing a polyolefin using the same according to the exemplary embodiments of the present disclosure will be described in more detail.

According to an embodiment of the present disclosure, a supported hybrid metallocene catalyst, including: a first metallocene compound represented by the following Chemical Formula 1;

a second metallocene compound which is represented by the following Chemical Formula 2 and one of $C_1$ and $C_2$ of Chemical Formula 2 is represented by the following Chemical Formula 3a;

a third metallocene compound which is represented by the following Chemical Formula 2 and one of $C_1$ and $C_2$ of Chemical Formula 2 is represented by the following Chemical Formula 3b;
a cocatalyst; and
a support, is provided.

[CHEMICAL FORMULA 1]

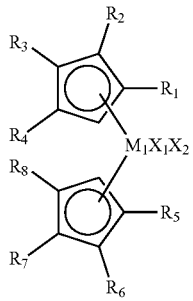

In Chemical Formula 1,
at least one of $R_1$ to $R_8$ is —$(CH_2)_n$—OR (wherein R is a C1 to C6 linear or branched alkyl group, and n is an integer of 2 to 10), and the others are the same as or different from each other, and are each independently hydrogen, a C1 to C20 alkyl group, a C2 to C20 alkenyl group, a C6 to C20 aryl group, a C7 to C20 alkylaryl group, or a C7 to C20 arylalkyl group,
$M_1$ is a Group 4 transition metal, and
$X_1$ and $X_2$ are the same as or different from each other, and are each independently a halogen or a C1 to C20 alkyl group.

[CHEMICAL FORMULA 2]

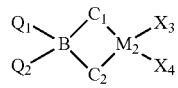

In Chemical Formula 2,
$M_2$ is a Group 4 transition metal,
$X_3$ and $X_4$ are the same as or different from each other, and are each independently a halogen or a C1 to C20 alkyl group,
B is carbon, silicon, or germanium,
at least one of $Q_1$ and $Q_2$ is —$(CH_2)_m$—OR' (wherein R' is a C1 to C6 linear or branched alkyl group, and m is an integer of 2 to 10), and the others are the same as or different from each other, and are each independently hydrogen, a halogen, a C1 to C20 alkyl group, a C2 to C20 alkenyl group, a C6 to C20 aryl group, a C7 to C20 alkylaryl group, or a C7 to C20 arylalkyl group, and
one of $C_1$ and $C_2$ is represented by the following Chemical Formula 3a or 3b, and the other is represented by the following Chemical Formula 3c.

[CHEMICAL FORMULA 3a]

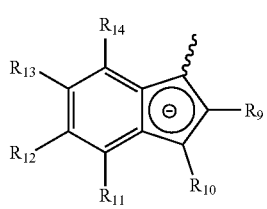

[CHEMICAL FORMULA 3b]

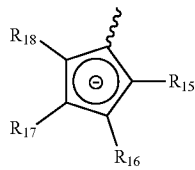

[CHEMICAL FORMULA 3c]

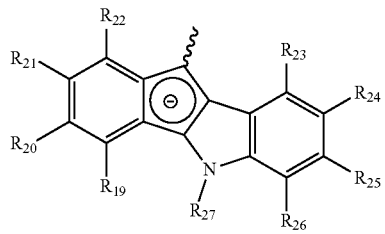

In Chemical Formulae 3a to 3c,
$R_9$ to $R_{27}$ are the same as or different from each other, and are each independently hydrogen, a C1 to C20 alkyl group, a C2 to C20 alkenyl group, a C1 to C20 alkoxy group, a C1 to C20 alkylsilyl group, a C1 to C20 silylalkyl group, a C6 to C20 aryl group, a C7 to C20 alkylaryl group, or a C7 to C20 arylalkyl group.

The substituents of Chemical Formulae 1, 2, 3a, 3b, and 3c of the supported hybrid metallocene catalyst according to the present disclosure will now be described in more detail.

The C1 to C20 alkyl group may include a linear or branched alkyl group, and specifically, it may be a methyl group, an ethyl group, a propyl group, an isopropyl group, an n-butyl group, a tert-butyl group, a pentyl group, a hexyl group, a heptyl group, an octyl group, or the like, but is not limited thereto.

The C2 to C20 alkenyl group may include a linear or branched alkenyl group, and specifically, it may be an allyl group, an ethenyl group, a propenyl group, a butenyl group, a pentenyl group, or the like, but is not limited thereto.

The C6 to C20 aryl group may include a single ring aryl group or a condensed ring aryl group, and specifically, it may be a phenyl group, a biphenyl group, a naphthyl group, a phenanthrenyl group, a fluorenyl group, or the like, but is not limited thereto.

The C1 to C20 alkoxy group may be a methoxy group, an ethoxy group, a phenyloxy group, a cyclohexyloxy group, or the like, but is not limited thereto.

The Group 4 transition metal may be titanium (Ti), zirconium (Zr), hafnium (Hf), or the like, but is not limited thereto.

As the first metallocene compound represented by Chemical Formula 1 introduces a substituent of —$(CH_2)$n-OR (wherein R is a C1 to C6 linear or branched alkyl group, and n is an integer of 2 to 10) to a substituent of cyclopentadiene (Cp), it may exhibit low conversion to a comonomer compared with other Cp-based catalysts containing no substituent when producing a polyolefin using a comonomer. Therefore, a polyolefin having a low molecular weight may be prepared.

When the first metallocene compound with the structure is supported on a support, the —$(CH_2)$n-OR group in the substituent can form a covalent bond through close interaction with a silanol group on the surface of silica used as the support, enabling stable supported polymerization.

In Chemical Formula 1, at least one of $R_1$ and $R_5$ is preferably —$(CH_2)_n$—OR, and n is more preferably 2 to 4.

This is because the —$(CH_2)_n$—OR group can affect comonomer incorporation to the alpha-olefin comonomers such as 1-butene or 1-hexene. In the case of having a short alkyl chain having n of 4 or less, the polyolefin having adjusted comonomer incorporation can be prepared without deteriorating other physical properties, because the comonomer incorporation with respect to the alpha-olefin comonomers is lowered while maintaining the polymerization activity.

Meanwhile, a specific example of the first metallocene compound represented by Chemical Formula 1 may be a compound represented by any one of the following structural formulae, but is not limited thereto.

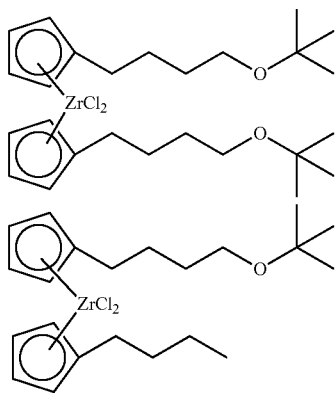

The second metallocene compound, which is represented by Chemical Formula 2 and one of $C_1$ and $C_2$ of Chemical Formula 2 is represented by Chemical Formula 3a, forms an asymmetrically cross-linked structure of an indenoindole derivative and an indene derivative by a bridge, and has a non-covalent electron pair capable of acting as a Lewis base in a ligand structure, thereby exhibiting high polymerization activity. In addition, the electronically enriched indenoindole derivative can stabilize beta-hydrogen of a polymer chain in which nitrogen atoms grow by hydrogen bonding to inhibit beta-hydrogen elimination and polymerize a polyolefin having a higher molecular weight than the case of the first metallocene compound.

In addition, the second metallocene compound exhibits high copolymerization activity and low hydrogen reactivity due to inclusion of the indene derivative having relatively low steric hindrance. Therefore, it may polymerize a polyolefin having a middle molecular weight of greater than the molecular weight of the polyolefin prepared using the first metallocene compound and smaller than the molecular weight of the polyolefin prepared using the third metallocene compound with high activity.

Further, in the second metallocene compound, $R_{10}$ of Chemical Formula 3a is preferably a C1 to C20 alkyl group, a C2 to C20 alkenyl group, a C1 to C20 alkoxy group, a C1 to C20 alkylsilyl group, a C1 to C20 silylalkyl group, a C6 to C20 aryl group, a C7 to C20 alkylaryl group, or a C7 to C20 arylalkyl group.

As described above, by introducing the substituent ($R_{10}$) at a specific position of the indene derivative of Chemical Formula 3a, it may have higher polymerization activity compared with a metallocene compound containing an unsubstituted indene compound or an indene compound substituted at another position.

In the second metallocene compound and in the following third metallocene compound, at least one of $R_{24}$ and $R_{27}$ of Chemical Formula 3c is preferably a C1 to C20 alkyl group, a C2 to C20 alkenyl group, a C1 to C20 alkoxy group, a C1 to C20 alkylsilyl group, a C1 to C20 silylalkyl group, a C6 to C20 aryl group, a C7 to C20 alkylaryl group, or a C7 to C20 arylalkyl group, and more preferably a methyl group, an ethyl group, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilylmethyl group, a methoxy group, or an ethoxy group.

In addition, a specific example of the compound represented by Chemical Formula 3c may be a compound represented by any one of the following structural formulae, but is not limited thereto.

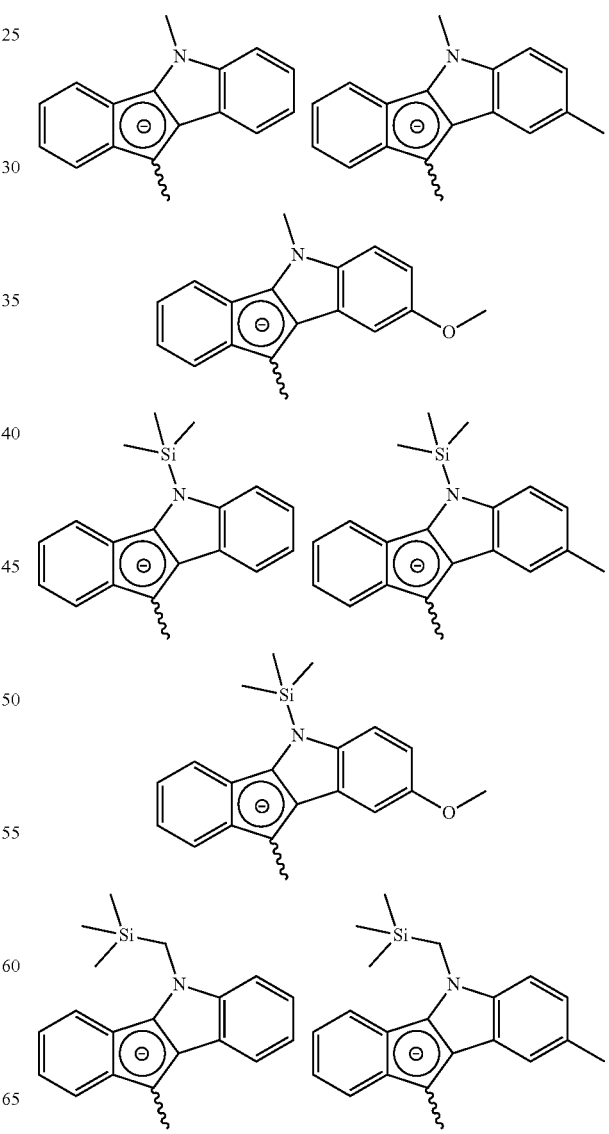

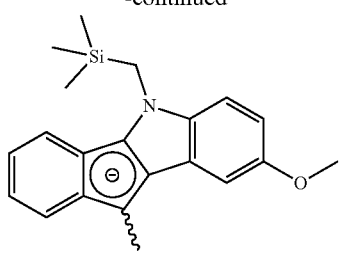
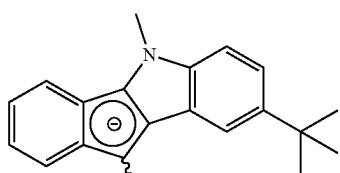
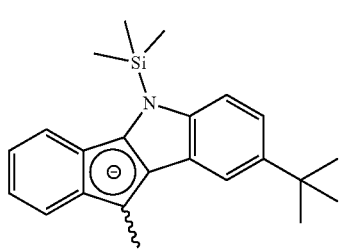
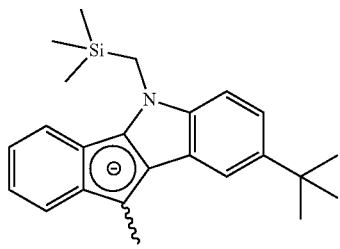
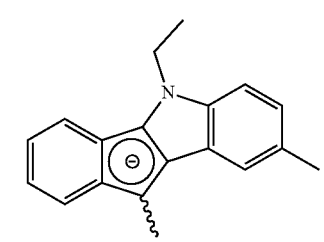
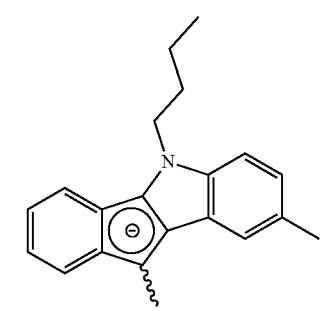
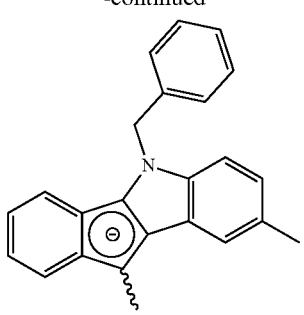
Meanwhile, a specific example of the second metallocene compound may be a compound represented by any one of the following structural formulae, but is not limited thereto.
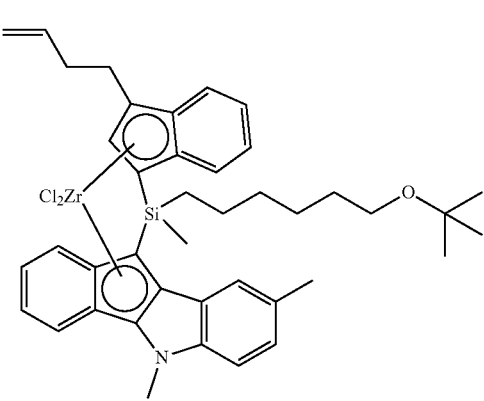
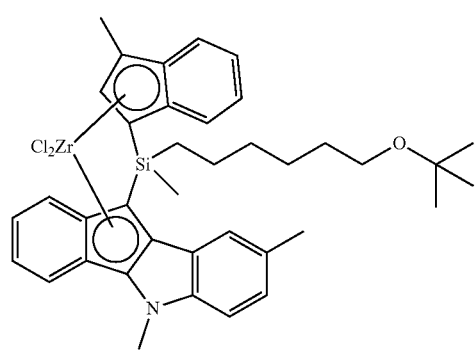
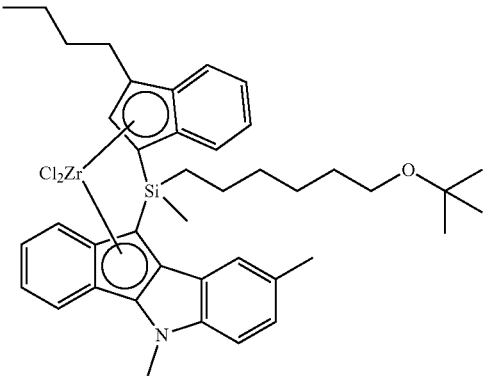

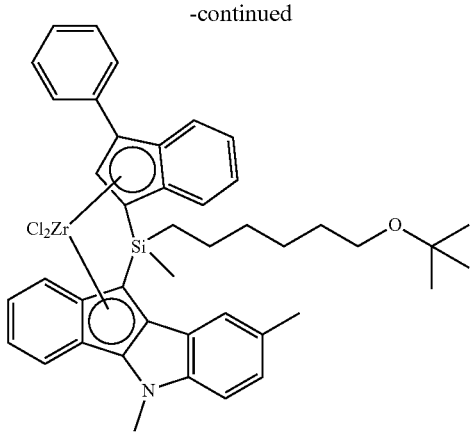

The third metallocene compound, which is represented by Chemical Formula 2 and one of $C_1$ and $C_2$ of Chemical Formula 2 is represented by Chemical Formula 3b, forms an asymmetrically cross-linked structure of an indenoindole derivative and a cyclopentadiene (Cp) derivative by a bridge, and has a non-covalent electron pair capable of acting as a Lewis base in a ligand structure, thereby exhibiting high polymerization activity. In addition, the electronically enriched indenoindole derivative can stabilize beta-hydrogen of a polymer chain in which nitrogen atoms grow by hydrogen bonding to inhibit beta-hydrogen elimination and polymerize a polyolefin having a higher molecular weight than the case of the first metallocene compound.

In addition, the third metallocene compound exhibits high copolymerization activity and low hydrogen reactivity due to inclusion of the cyclopentadiene (Cp) derivative having lower steric hindrance than the indene derivative. Therefore, it may polymerize a polyolefin having a high molecular weight of greater than the molecular weight of the polyolefin prepared using the first and second metallocene compounds with high activity.

Meanwhile, a specific example of the third metallocene compound may be a compound represented by the following structural formula, but is not limited thereto.

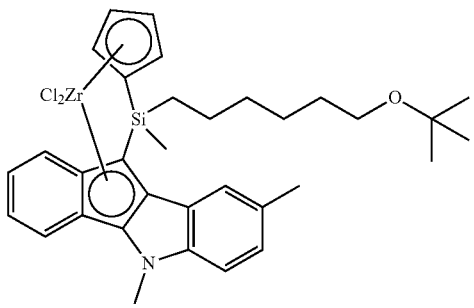

As described above, since the hybrid supported metallocene catalyst of the embodiment includes the first to third metallocene compounds, a polyolefin having a multimodal broad molecular weight distribution and exhibiting excellent processability and physical properties, particularly excellent environmental stress crack resistance (ESCR), can be prepared.

Particularly, a molar mixing ratio of the first metallocene compound to the second metallocene compound to the third metallocene compound may be about 1:0.1 to 5:0.1 to 5, and more preferably about 1:0.2 to 5:0.5 to 2.

In the supported hybrid metallocene catalyst of the present disclosure, as the cocatalyst which is supported on a support together with the metallocene compounds so as to activate the metallocene compounds, an organic metal compound including a Group 13 metal may be used without specific limitations as long as it can be used when polymerizing an olefin in the presence of a common metallocene catalyst.

Specifically, the cocatalyst compound may include at least one of an aluminum-containing first cocatalyst of the following Chemical Formula 4, and a borate-based second cocatalyst of the following Chemical Formula 5.

$$-[Al(R_{28})-O-]_k-$$ [CHEMICAL FORMULA 4]

In Chemical Formula 4, each $R_{28}$ is the same as or different from each other, and each is independently a halogen, or a C1 to C20 hydrocarbyl group substituted or unsubstituted with a halogen, and k is an integer of 2 or more.

$$T^+[BG_4]^-$$ [CHEMICAL FORMULA 5]

In Chemical Formula 5, $T^+$ is a polyatomic ion having a valence of +1, B is boron in a +3 oxidation state, each G is independently selected from the group consisting of hydride, dialkylamido, halide, alkoxide, aryloxide, hydrocarbyl, halocarbyl, and halo-substituted hydrocarbyl, and G has 20 or fewer carbons, provided that G is a halide in one or fewer positions.

The first cocatalyst of Chemical Formula 4 may be an alkylaluminoxane compound including repeating units bonded in a linear, circular, or network shape, and specific examples thereof may include methylaluminoxane (MAO), ethylaluminoxane, isobutylaluminoxane, butylaluminoxane, or the like.

Further, the second cocatalyst of Chemical Formula 5 may be a borate-based compound in the form of trisubstituted ammonium salt, dialkyl ammonium salt, or trisubstituted phosphonium salt. Specific examples of the second cocatalyst may include borate-based compounds in the form of tri-substituted ammonium salts, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecylclooctadecylammonium tetraphenylborate, N, N-dimethylanilinium tetraphenylborate, N, N-diethylanilinium tetraphenylborate, N, N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N, N-dimethylanilinium tetrakis(pentafluorophenyl)borate, N, N-diethylanilinium tetrakis(pentafluorophenyl)borate, N, N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N, N-dimethylanilinium tetrakis(2,3,4,6-tetrafluorophenyl)borate, N, N-diethylanilinium tetrakis(2,3,4,6-tetrafluorophenyl)borate, or N, N-dimethyl-(2,4,6-trimethylanilinium)tetrakis-(2,3,4,6-tetrafluorophenyl)borate; borate-based compounds in the form of dialkyl ammonium salts, such as dioctadecyl ammonium tetrakis(pentafluorophenyl)borate, ditetradecylammonium tetrakis(pentafluorophenyl)borate, or dicyclohexylammonium tetrakis(pentafluorophenyl)borate; or borate-based compounds such as tri-substituted phosphonium salts, such as triphenylphosphonium tetrakis(pentafluorophenyl)borate, methyldioctadecylphosphonium tetrakis(pentafluorophenyl)borate or tri(2,6-dimethylphenyl)phosphonium tetrakis(pentafluorophenyl)borate.

In the supported hybrid metallocene catalyst of the embodiment, a weight ratio of the total transition metal included in the first, second, and third metallocene compounds to the support may be 1:10 to 1:1000. When the support and the metallocene compounds are included within the above weight ratio, an optimal shape may be exhibited.

In addition, a weight ratio of the cocatalyst compound to the support may be 1:1 to 1:100. When the cocatalyst and the support are included within the above weight ratio, activity and fine structure of the polymer may be optimized.

In the supported hybrid metallocene catalyst of the embodiment, as the support, those containing hydroxyl groups on the surface may be used, and preferably, dried and surface moisture-removed supports having highly reactive hydroxyl groups and siloxane groups may be used.

For example, silica, silica-alumina, silica-magnesia, and the like that are dried at a high temperature may be used, and they may commonly contain oxides, carbonates, sulfates, and nitrates such as $Na_2O$, $K_2CO_3$, $BaSO_4$, $Mg(NO_3)_2$, and the like.

The drying temperature of the support may preferably be 200 to 800° C., more preferably 300 to 600° C., and most preferably 300 to 400° C. If the drying temperature of the support is less than 200° C., surface moisture may react with the cocatalyst due to excessive moisture. If it is greater than 800° C., pores on the surface of the support may be combined to reduce the surface area, and many hydroxyl groups may be lost on the surface and only siloxane groups may remain, thus decreasing the reaction sites with the cocatalyst, which is not preferable.

The amount of the hydroxyl groups on the surface of the support may be preferably 0.1 to 10 mmol/g, and more preferably 0.5 to 5 mmol/g. The amount of the hydroxyl groups on the surface of the support may be controlled by the preparation method and conditions of the support, or drying conditions, for example, temperature, time, vacuum, spray drying, or the like.

If the amount of the hydroxyl groups is less than 0.1 mmol/g, the number of reaction sites with the cocatalyst may be small, and if it is greater than 10 mmol/g, there is a possibility of being derived from moisture other than hydroxyl groups present on the surface of the support particle, which is not preferable.

The supported hybrid metallocene catalyst of the embodiment can be used as it is in the polymerization of olefinic monomers. Also, the supported hybrid metallocene catalyst may be prepared as a pre-polymerized catalyst by contacting the catalyst with olefinic monomers. For example, it may be prepared as a pre-polymerized catalyst by contacting the catalyst with olefinic monomers such as ethylene, propylene, 1-butene, 1-hexene, 1-octene, and the like.

Meanwhile, the supported hybrid metallocene catalyst may be prepared by using a method including the steps of: supporting a cocatalyst on a support; and supporting the first to third metallocene compounds on the cocatalyst-supported support.

Herein, the first to third metallocene compounds may be sequentially supported one by one, or two or three compounds may be supported together. At this time, there is no limitation on the order of supporting, but it is possible to improve the shape of the supported hybrid metallocene catalyst by supporting the third metallocene catalyst having relatively poor morphology in advance. Therefore, the second metallocene catalyst and the first metallocene catalyst may be sequentially supported after the third metallocene.

In the above method, the supporting conditions are not particularly limited, and the supporting step may be carried out within a range that is well-known to those skilled in the art. For example, the supporting step may be appropriately carried out at a high temperature and at a low temperature. For example, the supporting temperature may be in a range of −30° C. to 150° C., preferably in a range of room temperature to 100° C., and more preferably in a range of room temperature to 80° C. The supporting time may be appropriately controlled depending on the amount of the metallocene compounds to be supported. The reacted supported catalyst may be used without further treatment, after the reaction solvent is removed through filtration or distillation under reduced pressure, or subjected to Soxhlet filtering using an aromatic hydrocarbon such as toluene, if necessary.

The preparation of the supported catalyst may be carried out in the presence of a solvent or without a solvent. When the solvent is used, it may include aliphatic hydrocarbon solvents such as hexane or pentane, aromatic hydrocarbon solvents such as toluene or benzene, chlorinated hydrocarbon solvents such as dichloromethane, ether solvents such as diethylether or THF, and common organic solvents such as acetone or ethyl acetate. Preferred are hexane, heptane, and toluene.

According to another embodiment of the present disclosure, a method for preparing a polyolefin, including the step of polymerizing olefinic monomers in the presence of the supported hybrid metallocene catalyst, is provided.

Specific examples of the olefinic monomers may be at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

The polymerization of the olefinic monomers may be carried out by various polymerization processes that are known for polymerization of olefinic monomers such as a continuous solution polymerization process, a bulk polymerization process, a suspension polymerization process, a slurry polymerization process, or an emulsion polymerization process. The polymerization reaction may be carried out at a temperature of about 25 to 500° C., about 25 to 200° C., or about 50 to 150° C., and a pressure of about 1 to 100 bar or about 10 to 80 bar.

In the polymerization reaction, the supported hybrid metallocene catalyst may be used in a state of being dissolved or diluted in a solvent such as pentane, hexane, heptane, nonane, decane, toluene, benzene, dichloromethane, chlorobenzene, and the like. At this time, by treating the solvent with a small amount of alkylaluminum or the like, a small amount of water or air which can adversely affect the catalyst can be removed in advance.

In addition, the polyolefin prepared by the above method may be a polyolefin having a multimodal molecular weight distribution.

Further, the polyolefin may have a weight average molecular weight (Mw) of 100,000 to 300,000 g/mol. More preferably, the weight average molecular weight may be 120,000 g/mol or more, 130,000 g/mol or more, or 140,000 g/mol or more, and 250,000 g/mol or less, 220,000 g/mol or less, or 200,000 g/mol or less.

In addition, the polyolefin may have a molecular weight distribution (PDI) of 5 or more. More preferably, the molecular weight distribution may be 8 or more, 9 or more, or 10 or more, and 20 or less, 18 or less, or 17 or less.

The polyolefin may be an ethylene/alpha-olefin copolymer.

The ethylene/alpha-olefin copolymer may have a density of 0.948 to 0.960 g/cm$^3$, or 0.950 to 0.955 g/cm$^3$. If the density of the ethylene/alpha-olefin copolymer is lower than 0.948 g/cm$^3$ and the copolymer is used as a bottle cap of a carbonated beverage container, the swelling phenomenon may occur due to the pressure of the carbonated beverage. When decreasing the content of the alpha-olefin to increase the density, ESCR may be degraded. However, the ethylene/alpha-olefin copolymer exhibits excellent ESCR while having high density within the above-described appropriate range.

The ethylene/alpha-olefin copolymer may have an integral value in the region of log Mw of 5.0 to 5.5 in a GPC curve graph having an x-axis of log Mw and a y-axis of dw/dlogMw of 10 to 20%, preferably 10 to 18%, and more preferably 10 to 16% of the integral value of the entire x-axis. The Mw refers to a weight average molecular weight, and w refers to a weight fraction.

In the GPC curve graph, the region of log Mw of 5.0 to 5.5 is a region where the physical properties and processability of the product which is prepared by injecting the ethylene/alpha-olefin copolymer are confirmed.

The ratio of the integral value of the log Mw of 5.0 to 5.5 with respect to the integral value of the entire x-axis is a value representing a tie molecular fraction of the ethylene/alpha-olefin copolymer with high molecular weight. Thus, if the ratio of the integral value of the log Mw of 5.0 to 5.5 with respect to the integral of the entire x-axis is less than 10%, the ethylene/alpha-olefin copolymer may have a relatively low level of environmental stress crack resistance (ESCR). In addition, if the ratio of the integral value of the log Mw of 5.0 to 5.5 with respect to the integral of the entire x-axis is more than 20%, the proportion of the high molecular weight region in a tie molecular fraction distribution according to a molecular weight distribution (MWD) may be too high. Therefore, the processability of the ethylene/alpha-olefin copolymer may be greatly deteriorated.

In addition, the ethylene/alpha-olefin copolymer may have a spiral flow length (190° C., 90 bar) of 13 to 25 cm, more preferably 15 to 20 cm.

The spiral flow length (190° C., 90 bar) shows processability of the ethylene/alpha-olefin copolymer, and the larger the value, the better the processability. However, considering harmony of other mechanical properties and stability together with the processability, the larger spiral flow length is not always preferable, and an appropriate spiral flow length range suitable for use may be present.

The spiral flow length may be evaluated by a method of injecting a polymer by applying a specific pressure and temperature to a spiral mold and measuring how much of the molten polymer is pushed out. As in the following examples, the present disclosure may measure it by using a mold having a thickness of 1.5 mm and setting the injection temperature at 190° C., the mold temperature at 50° C., and the injection pressure at 90 bar. The spiral flow length of the ethylene/alpha-olefin copolymer of the present disclosure is 13 to 25 cm, thereby exhibiting excellent processability.

Further, the ethylene/alpha-olefin copolymer has excellent environmental stress crack resistance (ESCR) in addition to the mechanical properties and processability as described above.

In general, the processability and the environmental stress crack resistance are conflicting physical properties. Thus, if the melt index is increased to improve the processability, the environmental stress crack resistance is lowered. However, the ethylene/alpha-olefin copolymer of the embodiment prepared using the specific supported hybrid metallocene catalyst can satisfy both good processability and environmental stress crack resistance.

The ethylene/alpha-olefin copolymer may have environmental stress crack resistance (ESCR) measured according to ASTM D 1693 of 130 hours or more, 140 hours or more, or 150 hours or more. When the environmental stress crack resistance (ESCR) is 130 hours or more, it is possible to stably maintain the performance when used as a bottle cap. There is no specific upper limit, because higher environmental stress crack resistance (ESCR) can be evaluated as better. For example, ESCR may be 1000 hours or less, 800 hours or less, or about 500 hours or less. Since the ethylene/alpha-olefin copolymer exhibits the excellent environmental stress crack resistance, it may maintain performance with high stability when molded into a food container product such as a bottle cap and used even under high temperature and high pressure conditions.

The ethylene/alpha-olefin copolymer may have a melt index (MI, 190° C., 2.16 kg) of 0.7 g/10 min or less. More preferably, the melt index may be 0.05 g/10 min or more, 0.1 g/10 min or more, or 0.15 g/10 min or more, and 0.7 g/10 min or less, 0.6 g/10 min or less, or 0.5 g/10 min or less.

Advantageous Effects

When the supported hybrid metallocene catalyst according to the present disclosure is used, a polyolefin having excellent processability and a multimodal molecular weight distribution can be prepared.

DETAILED DESCRIPTION OF THE EMBODIMENTS

The present invention will be described in more detail with reference to the following examples. However, these examples are for illustrative purposes only, and the invention is not intended to be limited by these examples.

Preparation Example 1: Preparation of the First Metallocene Compound

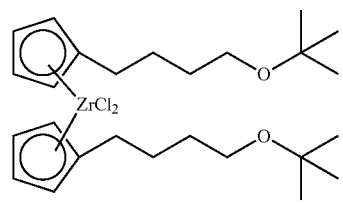

1-1 Preparation of Ligand Compound 10.8 g (100 mmol) of chlorobutanol was placed into a dried 250 mL Schlenk flask, 10 g of a molecular sieve and 100 mL of MTBE were added thereto, and then 20 g of sulfuric acid was slowly added thereto over 30 minutes. The reaction mixture slowly turned pink with time. After 16 hours, it was poured into a saturated sodium bicarbonate solution which was cooled down using ice. The mixture was extracted with ether (100 mL×4) several times. After the extracted organic layers were dried using MgSO$_4$ and filtered, the solvent was removed under vacuum-reduced pressure to obtain 10 g of a yellow liquid, 1-(tert butoxy)-4-chlorobutane (60% yield).

$^1$H NMR (500 MHz, CDCl$_3$): 1.16 (9H, s), 1.67~1.76 (2H, m), 1.86~1.90 (2H, m), 1.94 (1H, m), 3.36 (2H, m), 3.44 (1H, m), 3.57 (3H, m)

4.5 g (25 mmol) of synthesized 1-(tert butoxy)-4-chlorobutane was added into a dried 250 mL Schlenk flask, and dissolved in 40 mL of THF. 20 mL of a sodium cyclopentadienylide THF solution was slowly added thereto and stirred for one day. The reaction mixture was quenched by adding 50 mL of water, extracted with ether (50 mL×3), and then the extracted organic layers were washed with brine. After the remaining water was dried using MgSO$_4$ and filtered, the solvent was removed under vacuum-reduced pressure to obtain a dark brown viscous product, 2-(4-(tert-butoxy)butyl) cyclopenta-1,3-diene in a quantitative yield.

$^1$H NMR (500 MHz, CDCl$_3$): 1.16 (9H, s), 1.54~1.60 (4H, m), 1.65 (1H, m), 1.82 (1H, m), 2.37~2.42 (2H, m), 2.87, 2.92 (2H, s), 3.36 (2H, m), 5.99 (0.5H, s), 6.17 (0.5H, s), 6.25 (0.5H, s), 6.34 (0.5H, s), 6.42 (1H, s)

1-2 Preparation of Metallocene Compound 4.3 g (23 mmol) of the ligand compound synthesized in 1-1 was placed into a dried 250 mL Schlenk flask and dissolved in 60 mL of THF. 11 mL of an n-BuLi 2.0 M hexane solution (28 mmol) was added thereto, and stirred for one day. Then, this solution was added into a flask at −78° C. in which 3.83 g (10.3 mmol) of ZrCl$_4$(THF)$_2$ was dispersed in 50 mL of ether.

When the reaction mixture was heated to room temperature, a light brown suspension turned into a pale yellow suspension. After stirring for one day, all of the solvent of the reaction mixture was dried, and 200 mL of hexane was added thereto for sonication. Then, the hexane solution on the upper layer was collected by decantation with a cannula. The hexane solution obtained by repeating this process twice was dried under vacuum-reduced pressure to obtain a pale yellow solid product, bis(3-(4-(tert-butoxy)butyl-2,4-dien-yl) zirconium(IV) chloride.

$^1$H NMR (500 MHz, CDCl$_3$): 0.84 (6H, m), 1.14 (18H, s), 1.55~1.61 (8H, m), 2.61 (4H, m), 3.38 (4H, m), 6.22 (3H, s), 6.28 (3H, s)

Preparation Example 2: Preparation of the Second Metallocene Compound

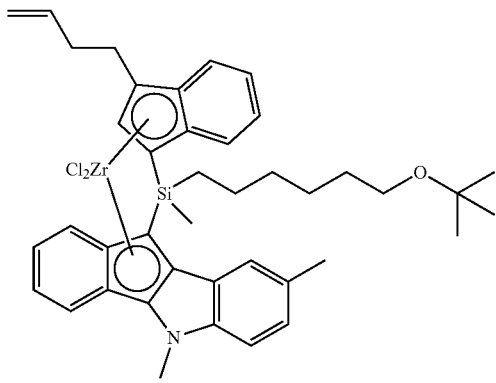

2-1 Preparation of Ligand Compound 1.7 g (10 mmol) of 5,8-dimethyl-5,10-dihydroindeno[1,2-b]indole was placed into a dried 250 mL Schlenk flask and 40 mL of ether was injected under argon. After cooling the ether solution to 0° C., 4.8 mL (12 mmol) of a 2.5 M n-BuLi hexane solution was slowly added dropwise. The reaction mixture was slowly heated to room temperature and stirred until the next day. After 20 mL of ether was placed in another 250 mL Schlenk flask, 3.6 mL (30 mmol) of dichloromethyl (tertbutoxyhexyl)silane was added thereto. After cooling the flask to −78° C., a lithiated solution of indenoindole was injected through a cannula. After the injection was completed, the reaction mixture was slowly heated to room temperature, stirred for about 5 hours, and then stirred for one day. After quenching by adding 50 mL of water, the organic layers were extracted, and dried using MgSO$_4$. The ether used as the solvent was removed under reduced pressure. It was confirmed by NMR that 10-((6-(tert-butoxy)hexyl)chloro(methyl)silyl)-5,8-dimethyl-5,10-dihydroindeno[1,2-b]indole was obtained with a yield of about 95% or more.

After the synthesis of the indenoindole part was confirmed, 1.7 g (10 mmol) of 3-(but-3-en-1-yl)-1H-indene was placed in a dried 100 mL Schlenk flask and dissolved in 40 mL of ether. Then, 4.8 ml (12 mmol) of a 2.5 M n-BuLi hexane solution was slowly added dropwise at −78° C. and stirred for one day. 10-((6-(tert-butoxy)hexyl)chloro(methyl)silyl)-5,8-dimethyl-5,10-dihydroindeno[1,2-b]indole prepared above was dissolved in 40 mL of ether, and then a lithiated solution of buthylindene was added dropwise at −78° C. After about 20 hours, it was quenched by adding 50 mL of water to extract the organic layers, followed by drying using MgSO$_4$. The solvent of the mixture obtained by filtration was evaporated under vacuum-reduced pressure. Therefore, 5.8 g (9.7 mmol, 97.1%) of 10-((3-(but-3-en-1-yl)-1H-inden-1-yl)(6-(tert-butoxy)hexyl)(methyl)silyl)-5,8-dimethyl-5,10-dihydroindeno[1,2-b]indole was obtained.

$^1$H NMR (500 MHz, CDCl3): −0.71, −0.23 (3H, d), 0.82 (2H, s), 1.17 (9H, s), 1.23 1.39 (7H, m), 1.51 (1H, s), 2.26 (2H, m), 2.48 (2H, m), 2.61 (2H, m), 3.25 (2H, m), 3.50 (1H, s), 3.82 (1H, s), 4.09 (3H, m), 5.03 (2H, m), 5.89 (1H, m), 7.08 (1H, s), 7.15~7.75 (11H, m)

2-2 Preparation of Metallocene Compound

The ligand was placed in a 250 mL oven-dried Schlenk flask, and dissolved in ether. 2.1 equivalents of an n-BuLi solution was added thereto and lithiated until the next day. In a glove box, one equivalent of ZrCl$_4$(THF)$_2$ was taken and placed in a 250 ml Schlenk flask to prepare a suspension containing ether or toluene. Both flasks were cooled down to −78° C. and ligand anions were slowly added to the Zr suspension. After the injection, the reaction mixture was slowly heated to room temperature. It was confirmed that, when the metallization was successfully carried out in this process, a purple color peculiar to the catalyst precursor appeared. After stirring it for one day, the toluene or ether in the mixture was removed under vacuum-reduced pressure to about ⅕ volume, and hexane was added thereto in a volume of about 5 times that of the remaining solvent. The reason for adding hexane at this time is to promote crystallization, because the synthesized catalyst precursor has low solubility in hexane. The hexane slurry was filtered under argon, and both the filtered solid and the filtrate were evaporated under vacuum-reduced pressure. The remaining filter cake was weighed and sampled in the glove box to confirm the synthesis, yield, and purity. Ether was used as a solvent in the metallation, and 2.5 g (30.5%) of a purple solid was obtained from 5.8 g (9.7 mmol) of ligand (purity (wt %)=90% by NMR, Mw=762.06).

$^1$H NMR (500 MHz, CDCl$_3$): 0.81 (3H, m), 1.19 (10H, m), 1.55~1.78 (10H, m), 1.97 (2H, m), 2.26 (2H, m), 2.54 (3H, s), 3.36 (2H, m), 3.94 (3H, s), 4.16 (1H, d), 4.85 (1H, m), 5.64 (1H, s), 6.53 (1H, s), 6.97 (2H, m), 7.10~7.45 (5H, m), 7.52~7.87 (4H, m)

Preparation Example 3: Preparation of the Third Metallocene Compound

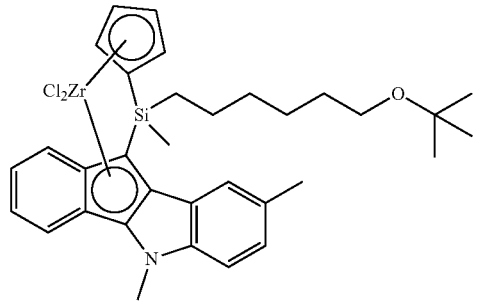

3-1 Preparation of Ligand Compound 3 g (10 mmol) of an indenoindole derivative was dissolved in 100 mL of hexane, and 4.4 mL (11 mmol) of a 2.5 M n-BuLi hexane solution was added dropwise thereto, followed by stirring overnight at room temperature. Another 250 mL Schlenk flask was prepared and placed in a glove box. Then, 2.7 g (10 mmol) of (6-tert-butoxyhexyl)dichloro(methyl)silane was weighed and taken out of the glove box, dissolved in 50 mL of hexane, and then lithiated slurry was added dropwise thereto. The mixture was slowly heated to room temperature and stirred overnight. 10 mmol of sodium Cp salt was dissolved in 100 mL of THF, and then added dropwise to the mixture, followed by stirring overnight at room temperature. After the reaction, the residual moisture in organic layers was removed by extraction with MgSO$_4$, and the solvent was removed under vacuum-reduced pressure to obtain a ligand compound in an oily state. This was confirmed by $^1$H NMR.

$^1$H NMR (500 MHz, CDCl$_3$): 7.74~6.49 (7H, m), 5.87 (6H, s), 3.32 (2H, m), 3.49 (3H, s), 1.50~1.25 (8H, m), 1.15 (9H, s), 0.50 (2H, m), 0.17 (3H, d)

3-2 Preparation of Metallocene Compound 7.9 mmol of the ligand compound synthesized in 3-1 was dissolved in 80 mL of toluene, and 6.6 mL (16.6 mmol) of a 2.5 M n-BuLi hexane solution was added dropwise thereto, followed by stirring overnight at room temperature. 7.9 mmol of ZrCl$_4$(THF)$_2$ was prepared as a slurry in 80 mL of toluene, and the ligand-Li solution was transferred thereto and stirred.

The reaction mixture was filtered to remove LiCl, and toluene of the filtrate was vacuum dried to obtain 1.5 g of a liquid catalyst with a yield of 23 mol %.

$^1$H NMR (500 MHz, CDCl$_3$): 7.66~7.20 (17H, m), $^1$H NMR (500 MHz, CDCl$_3$): 7.89~6.53 (19H, m), 5.82 (4H, s), 3.19 (2H, s), 2.40 (3H, m), 1.35~1.21 (4H, m), 1.14 (9H, s), 0.97~0.9 (4H, m), −0.34 (3H, t)

Examples of Preparation of Supported Hybrid Metallocene Catalyst

Example 1

3 kg of a toluene solution was placed in a 20 L SUS reactor, and the reactor temperature was maintained at 40° C. 1 kg of silica (Sylopol 948, manufactured by Grace Davison), dehydrated by applying vacuum at 600° C. for 12 hours, was added into the reactor and sufficiently dispersed. Then, 3 kg of a 10 wt % methylaluminoxane (MAO)/toluene solution was added thereto, followed by stirring at 40° C. and 200 rpm for 12 hours.

The metallocene compound of Preparation Example 3 was dissolved in toluene, and then added to the reactor at a ratio of 0.1 mmol/gSiO$_2$, followed by stirring and reacting at 40° C. for 2 hours.

Subsequently, the metallocene compound of Preparation Example 2 was added to the reactor at a ratio of 0.15 mmol/gSiO$_2$, and then stirred at 40° C. and 200 rpm for 2 hours. The metallocene compound of Preparation Example 1 was added to the reactor at a ratio of 0.15 mmol/gSiO$_2$, and then stirred at 40° C. and 200 rpm for 2 hours.

The hexane slurry was transferred to a filter and the hexane solution was filtered. Subsequently, it was dried under reduced pressure at 40° C. for 4 hours to prepare 1 kg of a supported hybrid catalyst Example 2

A supported hybrid metallocene catalyst was prepared in the same manner as in Example 1, except that the metallocene compound prepared in Preparation Example 1 was added at a ratio of 0.1 mmol/gSiO$_2$.

Example 3

A supported hybrid metallocene catalyst was prepared in the same manner as in Example 1, except that the metallocene compound prepared in Preparation Example 1 was added at a ratio of 0.1 mmol/gSiO$_2$, and the metallocene compound prepared in Preparation Example 2 was added at a ratio of 0.1 mmol/gSiO$_2$.

Comparative Example 1

A polyethylene copolymer (ME1000, manufactured by LG Chem Ltd.) prepared by using a Ziegler-Natta catalyst was used as Comparative Example 1.

Comparative Example 2

A supported hybrid metallocene catalyst was prepared in the same manner as in Example 1, except that the metallocene compound prepared in Preparation Example 1 was added at a ratio of 0.1 mmol/gSiO$_2$, the metallocene compound prepared in Preparation Example 2 was added at a ratio of 0.2 mmol/gSiO$_2$, and the metallocene compound prepared in Preparation Example 3 was not added.

Experimental Example: Preparation of Ethylene/1-Butene Copolymer

Each of the supported hybrid metallocene catalysts prepared in the examples was added into a CSTR continuous polymerization reactor (reactor volume of 50 L) to prepare an olefin polymer. 1-butene was used as a comonomer, and the reactor pressure was maintained at 10 bar and the polymerization temperature was maintained at 90° C.

The polymerization conditions using the supported hybrid metallocene catalysts of Examples 1 to 3 and Comparative Examples 1 and 2 are summarized in Table 1 below.

TABLE 1

| | Catalyst | Polymerization conditions | | |
|---|---|---|---|---|
| | | Pressure (bar)/ Temp (° C.) | Hydrogen (g/h) | 1-butene (cc/min) |
| Example 1 | Prep. Example 3 0.10 mmol/gSiO₂ Prep. Example 2 0.15 mmol/gSiO₂ Prep. Example 1 0.15 mmol/gSiO₂ | 10/90 | 2.0 | 6 |
| Example 2 | Prep. Example 3 0.10 mmol/gSiO₂ Prep. Example 2 0.15 mmol/gSiO₂ Prep. Example 1 0.10 mmol/gSiO₂ | 10/90 | 3.0 | 7 |
| Example 3 | Prep. Example 3 0.10 mmol/gSiO₂ Prep. Example 2 0.10 mmol/gSiO₂ Prep. Example 1 0.10 mmol/gSiO₂ | 10/90 | 3.4 | 8 |
| Comp. Example 1 | | 10/90 | 2.0 | 4 |
| Comp. Example 2 | Prep. Example 2 0.20 mmol/gSiO₂ Prep. Example 1 0.10 mmol/gSiO₂ | 10/90 | 1.8 | 4 |

The physical properties of the polyolefins prepared in Examples 1 to 3 and Comparative Examples 1 and 2 were measured by the following methods and are shown in Table 2.

(1) Mn, Mw, PDI, GPC curve: The sample was pretreated by dissolving in 1,2,4-trichlorobenzene containing 0.0125% of BHT at 160° C. for 10 hours using PL-SP260. The number average molecular weight (Mn) and the weight average molecular weight (Mw) were measured at 160° C. using PL-GPC220. PDI is represented by the ratio (Mw/Mn) between the weight average molecular weight and the number average molecular weight. In addition, the ratio of an integral value in the region of log Mw of 4.5~5.0, 5.0~5.5, or 5.5~6.0 to an integral value of the entire x-axis in a GPC curve graph having an x-axis of log Mw and a y-axis of dw/dlogMw was calculated and is shown in Table 2 below.

(32) Density (g/cm³): It was measured according to ASTM 1505.

(3) Melt index (MI, 2.16 kg): It was measured at 190° C. according to ASTM 1238.

(4) ESCR: The number of hours to F50 (50% crack) was measured using a 10% Igepal CO-630 solution according to ASTM D 1693 at 50° C.

(5) Spiral flow length: ENGEL 150 ton injection machine was used. The mold thickness was 1.5 mm, the injection temperature was 190° C., the mold temperature was 50° C., and the injection pressure was 90 bar.

TABLE 2

| | | Ex. 1 | Ex. 2 | Ex. 3 | Comp. Ex. 1 | Comp. Ex. 2 |
|---|---|---|---|---|---|---|
| Catalytic activity (kgPE/gSiO₂) | | 41.5 | 32.1 | 36.4 | 15.3 | 33.5 |
| Mw (g/mol) | | 167,000 | 174,000 | 161,000 | 137,000 | 138,000 |
| PDI | | 11.2 | 14.0 | 15.7 | 10.3 | 9.8 |
| ESCR (h) | | 180 | 160 | 220 | 120 | 50 |
| MI₂ (g/10 min) | | 0.31 | 0.30 | 0.46 | 0.78 | 0.41 |
| Density | | 0.951 | 0.951 | 0.953 | 0.952 | 0.952 |
| Spiral Flow (cm) | | 16.1 | 15.3 | 17.3 | 10.0 | 10.0 |
| Fraction (%) | 4.5~5.0 | 22.91 | 19.51 | 18.31 | 26.77 | 20.4 |
| | 5.0~5.5 | 14.55 | 13.50 | 10.46 | 21.15 | 21.9 |
| | 5.5~6.0 | 10.39 | 9.92 | 8.76 | 9.85 | 8.40 |

As shown in Table 2, the ethylene/alpha-olefin copolymer of Examples exhibits a broad molecular weight distribution, and its ratio in the region of log Mw of 5.0 to 5.5 satisfies a specific range. Therefore, it has the environmental stress crack resistance of 150 hours or more and the relatively high spiral flow length, indicating excellent processability and remarkably improved environmental stress crack resistance.

What is claimed is:

1. A supported hybrid metallocene catalyst, comprising:

a first metallocene compound represented by the following Chemical Formula 1;

a second metallocene compound which is represented by the following Chemical Formula 2 and one of C₁ and C₂ of Chemical Formula 2 is represented by the following Chemical Formula 3a;

a third metallocene compound which is represented by the following Chemical Formula 2 and one of C₁ and C₂ of Chemical Formula 2 is represented by the following Chemical Formula 3b;

a cocatalyst; and a support:

[CHEMICAL FORMULA 1]

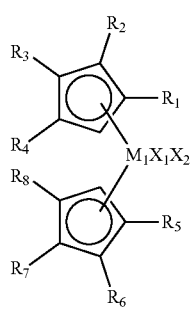

in Chemical Formula 1, at least one of $R_1$ to $R_8$ is —$(CH_2)_n$—OR, wherein R is a C1 to C6 linear or branched alkyl group, and n is an integer of 2 to 10, and the others are the same as or different from each other, and are each independently hydrogen, a C1 to C20 alkyl group, a C2 to C20 alkenyl group, a C6 to C20 aryl group, a C7 to C20 alkylaryl group, or a C7 to C20 arylalkyl group, $M_1$ is a Group 4 transition metal, and $X_1$ and $X_2$ are the same as or different from each other, and are each independently a halogen or a C1 to C20 alkyl group,

[CHEMICAL FORMULA 2]

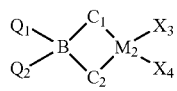

in Chemical Formula 2, $M_2$ is a Group 4 transition metal, $X_3$ and $X_4$ are the same as or different from each other, and are each independently a halogen or a C1 to C20 alkyl group, B is carbon, silicon, or germanium, at least one of $Q_1$ and $Q_2$ is $—(CH_2)_m—OR'$, wherein R' is a C1 to C6 linear or branched alkyl group, and m is an integer of 2 to 10, and the others are the same as or different from each other, and are each independently hydrogen, a halogen, a C1 to C20 alkyl group, a C2 to C20 alkenyl group, a C6 to C20 aryl group, a C7 to C20 alkylaryl group, or a C7 to C20 arylalkyl group, and one of $C_1$ and $C_2$ is represented by the following Chemical Formula 3a or 3b, and the other is represented by the following Chemical Formula 3c,

[CHEMICAL FORMULA 3a]

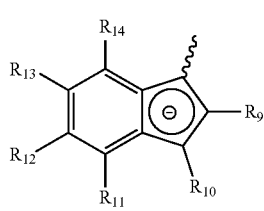

[CHEMICAL FORMULA 3b]

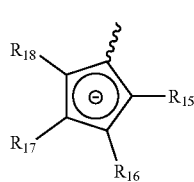

[CHEMICAL FORMULA 3c]

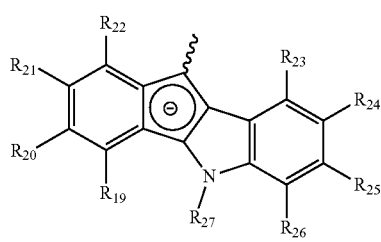

in Chemical Formulae 3a to 3c, $R_9$ to $R_{27}$ are the same as or different from each other, and are each independently hydrogen, a C1 to C20 alkyl group, a C2 to C20 alkenyl group, a C1 to C20 alkoxy group, a C1 to C20 alkylsilyl group, a C1 to C20 silylalkyl group, a C6 to C20 aryl group, a C7 to C20 alkylaryl group, or a C7 to C20 arylalkyl group.

2. The supported hybrid metallocene catalyst of claim 1, wherein at least one of $R_1$ and $R_5$ of Chemical Formula 1 is $—(CH_2)_n—OR$, wherein R is a C1 to C6 linear or branched alkyl group, and n is an integer of 2 to 10.

3. The supported hybrid metallocene catalyst of claim 1, wherein $R_{10}$ of Chemical Formula 3a is a C1 to C20 alkyl group, a C2 to C20 alkenyl group, a C1 to C20 alkoxy group, a C1 to C20 alkylsilyl group, a C1 to C20 silylalkyl group, a C6 to C20 aryl group, a C7 to C20 alkylaryl group, or a C7 to C20 arylalkyl group.

4. The supported hybrid metallocene catalyst of claim 1, wherein at least one of $R_{24}$ and $R_{27}$ of Chemical Formula 3c is a C1 to C20 alkyl group, a C2 to C20 alkenyl group, a C1 to C20 alkoxy group, a C1 to C20 alkylsilyl group, a C1 to C20 silylalkyl group, a C6 to C20 aryl group, a C7 to C20 alkylaryl group, or a C7 to C20 arylalkyl group.

5. The supported hybrid metallocene catalyst of claim 1, wherein the first metallocene compound is selected from the group consisting of the following structural formulae:

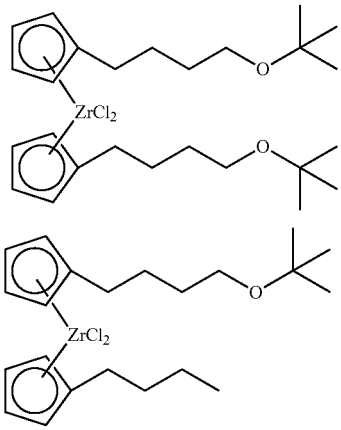

6. The supported hybrid metallocene catalyst of claim 1, wherein the second metallocene compound is selected from the group consisting of the following structural formulae:

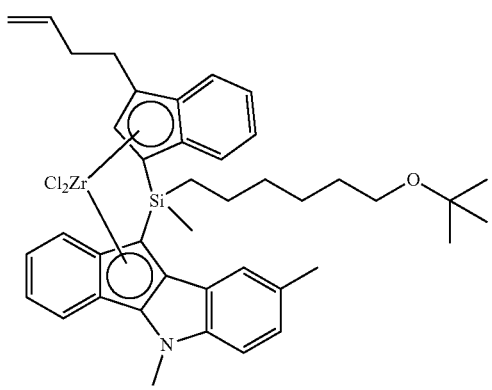

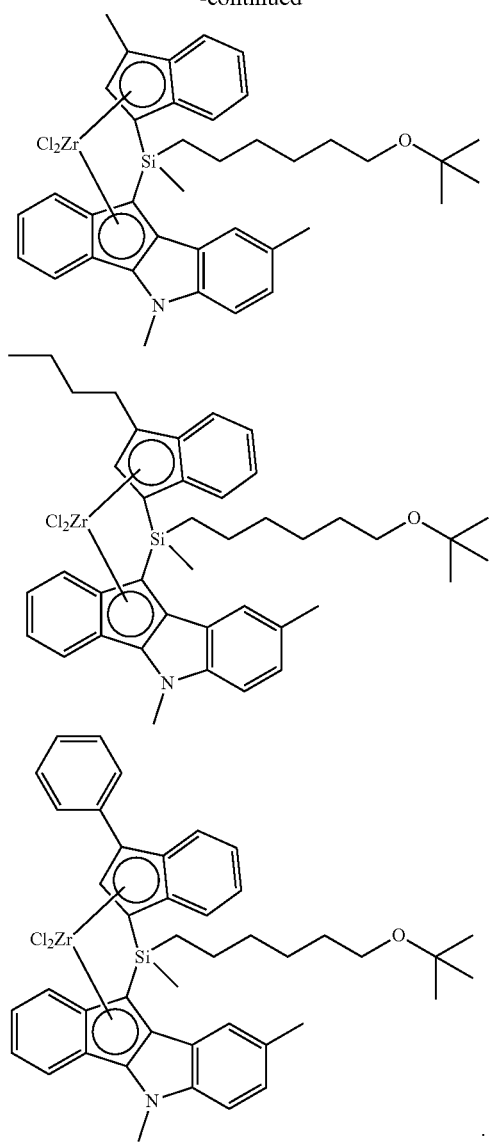

7. The supported hybrid metallocene catalyst of claim 1, wherein the third metallocene compound is represented by the following structural formula:

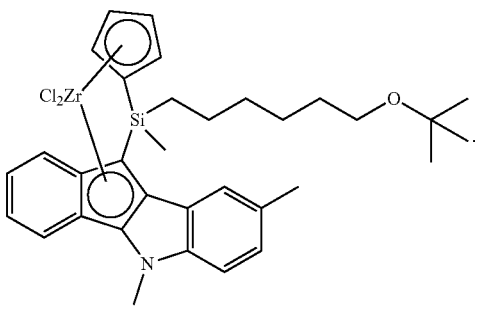

8. The supported hybrid metallocene catalyst of claim 1, wherein a molar mixing ratio of the first metallocene compound to the second metallocene compound to the third metallocene compound is 1:0.1 to 5:0.1 to 5.

9. The supported hybrid metallocene catalyst of claim 1, wherein the cocatalyst comprises at least one selected from the group consisting of a first cocatalyst represented by the following Chemical Formula 4 and a second cocatalyst represented by the following Chemical Formula 5:

$$-[Al(R_{28})-O-]_k- \qquad \text{[CHEMICAL FORMULA 4]}$$

in Chemical Formula 4, each $R_{28}$ is the same as or different from each other, and each is independently a halogen, or a C1 to C20 hydrocarbyl group substituted or unsubstituted with a halogen, and k is an integer of 2 or more, $$T^+[BG_4]^- \qquad \text{[CHEMICAL FORMULA 5]}$$

in Chemical Formula 5, $T^+$ is a polyatomic ion having a valence of +1, B is boron in a +3 oxidation state, and each G is independently selected from the group consisting of hydride, dialkylamido, halide, alkoxide, aryloxide, hydrocarbyl, halocarbyl, and halo-substituted hydrocarbyl, and G has 20 or fewer carbons, provided that G is a halide in one or fewer positions.

10. A method for preparing a polyolefin, comprising the step of polymerizing olefinic monomers in the presence of the supported hybrid metallocene catalyst of claim 1.

11. The method of claim 10, wherein the olefinic monomers include at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

* * * * *